(12) United States Patent
van der Merwe et al.

(10) Patent No.: US 10,961,850 B2
(45) Date of Patent: Mar. 30, 2021

(54) ROTATABLE TORQUE FRAME FOR GAS TURBINE ENGINE

(71) Applicant: General Electric Company, Schenectady, NY (US)

(72) Inventors: Gert Johannes van der Merwe, Lebanon, OH (US); Darek Tomasz Zatorski, Fort Wright, KY (US); Richard Alan Wesling, Cincinnati, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 15/708,762

(22) Filed: Sep. 19, 2017

(65) Prior Publication Data

US 2019/0085698 A1    Mar. 21, 2019

(51) Int. Cl.
*F01D 1/26* (2006.01)
*F01D 5/06* (2006.01)
(Continued)

(52) U.S. Cl.
CPC .......... *F01D 1/26* (2013.01); *F01D 1/24* (2013.01); *F01D 5/03* (2013.01); *F01D 5/06* (2013.01); *F01D 5/14* (2013.01); *F01D 5/34* (2013.01); *F02C 3/067* (2013.01); *F05D 2220/32* (2013.01); *F05D 2240/24* (2013.01);
(Continued)

(58) Field of Classification Search
CPC ..... F01D 1/26; F01D 1/24; F01D 1/04; F01D 5/03; F01D 5/06; F01D 5/34; F01D 5/143; F01D 5/141; F01D 5/225; F01D 5/02; F01D 5/14; F05D 2250/38; F05D 2250/44; F05D 2220/32; F05D 2250/75; F05D 2260/15; F05D 2260/52; F05D 2240/30; F05D 2240/24; F02C 3/06; F02C 3/067
USPC ...... 415/65, 68, 69; 416/128, 129, 189, 190, 416/191, 192, 193 R, 193 A
See application file for complete search history.

(56) References Cited

U.S. PATENT DOCUMENTS 4,433,955 A * 2/1984 Johnston ................. F01D 5/141
                                                                    415/1
5,207,622 A    5/1993 Wilkinson et al.
(Continued)

FOREIGN PATENT DOCUMENTS

CN    106677831 A    5/2017
EP    0631041 A1    12/1994
(Continued)

OTHER PUBLICATIONS

European Search Report Corresponding to Application No. 18192783 dated Dec. 21, 2018.
(Continued)

*Primary Examiner* — Christopher Verdier
(74) *Attorney, Agent, or Firm* — Dority & Manning, P.A.

(57) ABSTRACT

A gas turbine engine including a torque frame is provided. The torque frame includes an inner shroud defined circumferentially around the axial centerline, an outer shroud surrounding the inner shroud and defined circumferentially around the axial centerline, and a structural member extended along the radial direction and coupled to the inner shroud and the outer shroud. The torque frame is configured to rotate around the axial centerline.

17 Claims, 12 Drawing Sheets

(51) Int. Cl.
  *F01D 5/14* (2006.01)
  *F01D 5/34* (2006.01)
  *F01D 5/03* (2006.01)
  *F02C 3/067* (2006.01)
  *F01D 1/24* (2006.01)

(52) U.S. Cl.
  CPC ...... *F05D 2240/30* (2013.01); *F05D 2250/38* (2013.01); *F05D 2250/44* (2013.01); *F05D 2250/75* (2013.01); *F05D 2260/15* (2013.01); *F05D 2260/52* (2013.01)

(56) References Cited

U.S. PATENT DOCUMENTS

| | | | |
|---|---|---|---|
| 5,361,580 A * | 11/1994 | Ciokajlo | F01D 25/162 |
| | | | 60/226.1 |
| 5,388,964 A * | 2/1995 | Ciokajlo | F01D 5/022 |
| | | | 416/204 A |
| 5,443,590 A | 8/1995 | Ciokajlo et al. | |
| 7,513,102 B2 | 4/2009 | Moniz et al. | |
| 7,594,388 B2 | 9/2009 | Cherry et al. | |
| 7,927,075 B2 | 4/2011 | Suciu et al. | |
| 8,061,968 B2 | 11/2011 | Merry et al. | |
| 8,152,469 B2 | 4/2012 | Suciu et al. | |
| 8,943,796 B2 | 2/2015 | McCaffrey | |
| 9,534,608 B2 | 1/2017 | Gehlot et al. | |
| 9,701,395 B2 | 7/2017 | Veilleux, Jr. et al. | |
| 2010/0154384 A1 * | 6/2010 | Schilling | F02C 3/107 |
| | | | 60/268 |
| 2015/0284071 A1 | 10/2015 | Veilleuz, Jr. et al. | |
| 2018/0209274 A1 * | 7/2018 | Zatorski | F01D 25/12 |

FOREIGN PATENT DOCUMENTS

| | | |
|---|---|---|
| EP | 0643199 A1 | 3/1995 |
| GB | 2194593 A | 3/1988 |
| JP | S50131401 U | 10/1975 |
| JP | S63134817 A | 6/1988 |
| JP | H07145741 A | 6/1995 |
| JP | H07166960 A | 6/1995 |
| WO | WO2018/140111 A1 | 8/2018 |

OTHER PUBLICATIONS

Machine Translated Japanese Search Report Corresponding to Application No. 2018170143 dated Nov. 12, 2019.
Machine Translated Japanese Office Action Corresponding to Application No. 2018170143 dated Nov. 14, 2019.
European Office Action Corresponding to Application No. 18192783 dated Feb. 12, 2020.

* cited by examiner

ROTATABLE TORQUE FRAME FOR GAS TURBINE ENGINE

FIELD

The present subject matter relates generally to gas turbine engine architecture. More particularly, the present subject matter relates to a rotatable torque frame for gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Interdigitated turbine sections are known to take advantage of relatively high fluid velocities between sequential stages of rotating airfoils without vanes therebetween. However, known interdigitated turbine sections are limited to interdigitating a low pressure turbine rotor and an intermediate pressure turbine rotor. Still further, known interdigitated turbine sections are limited by axial, radial, thermal, and/or mechanical loads from the inner radii of the interdigitated turbine sections, which may limit a quantity of stages that may be included in an interdigitated outer drum rotor.

Therefore, there exists a need for a structure that may reduce or remove limits to interdigitated outer drum rotor size and structural life due to axial, radial, thermal, and/or mechanical loads.

BRIEF DESCRIPTION

Aspects and advantages of the invention will be set forth in part in the following description, or may be obvious from the description, or may be learned through practice of the invention.

The present disclosure is directed to a gas turbine engine including a torque frame. The torque frame includes an inner shroud defined circumferentially around an axial centerline, an outer shroud surrounding the inner shroud and defined circumferentially around the axial centerline, and a structural member extended along the radial direction and coupled to the inner shroud and the outer shroud. The torque frame is configured to rotate around the axial centerline.

In various embodiments, the structural member is extended along a longitudinal direction to define a lean angle relative to the axial centerline. In one embodiment, the lean angle is acute relative to the axial centerline. A radially outward end of the structural member is disposed upstream of a radially inward end of the structural member. In another embodiment, the lean angle is obtuse or perpendicular relative to the axial centerline. A radially inward end of the structural member is disposed upstream of a radially outward end of the structural member.

In one embodiment, the structural member defines an airfoil defining a pressure side and a suction side.

In various embodiments, the torque frame further includes an outer band circumferentially surrounding the outer shroud. The outer band is extended at least partially along the radial direction. In still various embodiments, the torque frame further includes a plurality of connecting members extended at least partially along the radial direction and coupled to the outer shroud and the outer band. In one embodiment, the connecting members extend at least partially along the circumferential direction from the outer shroud to the outer band. In another embodiment, the connecting members define a spring. In still another embodiment, the connecting members define an approximately V cross section. In still yet another embodiment, the outer band defines an annular ring generally concentric about the axial centerline. In one embodiment, outer shroud defines a platform extended at least partially along the longitudinal direction and at least partially along the circumferential direction, in which the connecting members extend from the platform to the outer band. In another embodiment, the outer band defines one or more balance planes along a portion of an inner diameter and/or along a portion of an outer diameter. In still another embodiment, the structural member, the inner shroud, the outer shroud, the plurality of connecting members and the outer band together define an integral structure.

In still yet another embodiment, an outer drum rotor is coupled to the outer band of the torque frame. The outer drum rotor includes one or more stages of a plurality of outer drum airfoils extended inward along the radial direction.

In one embodiment, the structural member, the inner shroud, and the outer shroud together define an integral structure.

In various embodiments, the gas turbine engine further includes a second turbine rotor disposed radially inward of the outer drum rotor. The second turbine rotor includes one or more stages of second turbine airfoils extended outward along the radial direction. The second turbine rotor is independently rotatable relative to the torque frame and the outer drum rotor. In one embodiment, the torque frame is disposed downstream of the second turbine rotor. In another embodiment, the torque frame is disposed upstream of the second turbine rotor.

In one embodiment, the torque frame and the outer drum rotor together define a low speed rotor. The second turbine rotor defines a higher speed rotor relative to the low speed rotor.

In another embodiment, an inner drum rotor is coupled to the inner shroud of the torque frame. The inner drum rotor includes one or more stages of a plurality of inner drum airfoils extended outward along the radial direction. The torque frame, the outer drum rotor, and the inner drum rotor together rotate at a first speed around the axial centerline.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
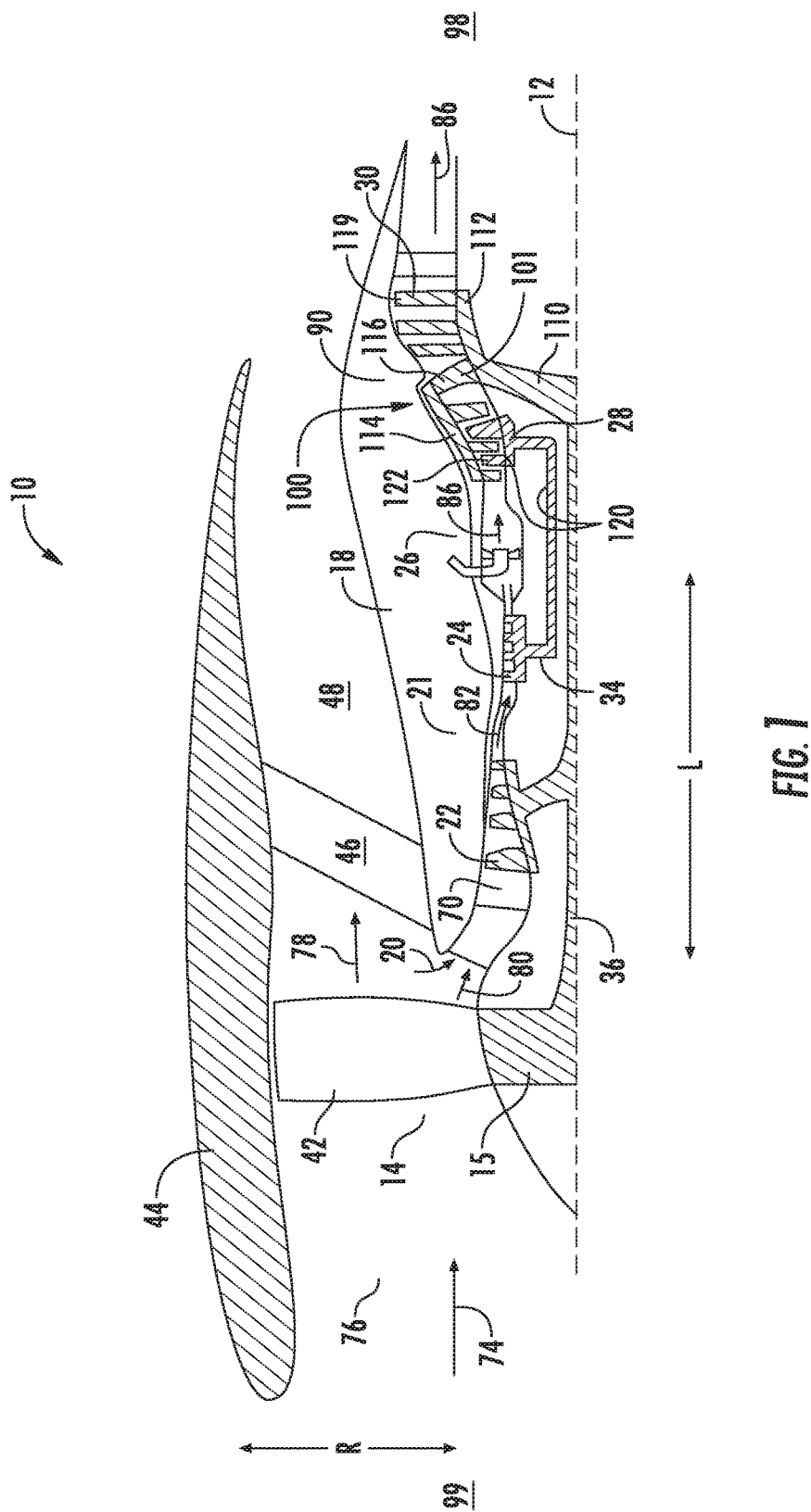
FIG. 1 is a schematic cross sectional view of an exemplary gas turbine engine incorporating an exemplary embodiment of a turbine section according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry into a compressor section through exit from a turbine section.

Various embodiments of a rotating torque frame for a gas turbine engine are generally provided. The torque frame includes an inner shroud, an outer shroud outward of the inner shroud in the radial direction, and at least one structural member coupling the inner shroud and the outer shroud along the radial direction. Various embodiments further include an outer band circumferentially surrounding the outer shroud radially outward of the outer shroud. An outer drum rotor is coupled to the outer band and extended therefrom along the longitudinal direction. One or more stages of a plurality of outer drum airfoils is extended inward along the radial direction. The torque frame is configured to rotate around an axial centerline of the gas turbine engine.

The structural members of the rotating torque frame transfers reaction loads from combustion gases within the flowpath of the engine, such as loads along the axial or longitudinal direction. The structural members further transfer radial and circumferential loads from the inner shroud and the outer shroud. In various embodiments, the outer band further provides structural support, such as defining an annular ring surrounding the outer shroud to which the outer drum rotor is coupled and extended along the longitudinal direction. In still various embodiments, the torque frame further includes connecting members extended at least partially along the radial direction coupling the outer shroud to the outer band. The connecting members may further transfer loads from the inner shroud, the structural members, and the outer shroud to the outer band. The connecting members may define springing properties configured to attenuate undesired engine dynamics. The connecting members may further provide radial growth or movement of the structural members while the outer band provides structural stiffness. Still further, the connecting members may attenuate the high temperature gradient within a secondary flowpath defined between the outer shroud and the outer band. In various embodiments, the connecting members from the outer shroud to the outer band may transfer thermal, axial, radial, and mechanical loads to the outer band while providing adequate radial stiffness to support an overhung or cantilevered outer drum rotor for an interdigitated turbine section. Still further, the outer band may provide sufficient stiffness to attenuate undesired vibratory modes, harmonics, or noise and/or generally promote desired engine dynamics.

An interdigitated turbine section may increase fuel efficiency, operational efficiency, and/or power output while reducing weight, part count, and/or packaging (e.g. radial and/or axial dimensions). For example, the interdigitated turbine section may enable increased bypass ratio and/or overall pressure ratio of the gas turbine engine, thereby increasing fuel efficiency, operational efficiency, and/or power output relative to other engines of similar power output and/or packaging. The interdigitated turbine section may further reduce stationary and/or rotating airfoil quantities, and thereby engine packaging and/or weight, while maintaining or improving efficiencies, performance, or power output. Still further, the interdigitated turbine section may reduce a product of axial flow area and the square of the rotational speed (the product referred to as "$AN^2$") while additionally reducing an average work factor per stage of the turbine section.

Referring now to the drawings, FIG. 1 is a schematic cross sectional view of an exemplary gas turbine engine 10 (herein referred to as "engine 10"), shown as a high bypass turbofan engine, incorporating an exemplary embodiment of a turbine section 90 according to an aspect of the present disclosure. Although further described below with reference to a turbofan engine, the present disclosure is also applicable to turbomachinery in general, including propfan, turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. The engine 10 defines a longitudinal direction L, a radial direction R, an upstream end 99 and a downstream end 98 along the longitudinal direction L, and a circumferential direction C (shown in FIGS. 3-4).

In general, the engine 10 may include a substantially tubular outer casing 18 that defines an annular inlet 20. The outer casing 18 encases or at least partially flows, in serial flow arrangement along the longitudinal direction L, a compressor section 21, a combustion section 26, and an interdigitated turbine section 90 (herein referred to as "turbine section 90"). A fan assembly 14 is disposed generally forward or upstream 99 of the compressor section 21. In the embodiment shown in FIG. 1, the engine 10 defines a two-spool configuration in which the compressor section 21 includes a first compressor 22 and a second compressor 24 in serial arrangement along the longitudinal direction L. The fan assembly 14 and the first compressor 22 are coupled to a first shaft 36 toward the upstream end 99 of the engine 10 and a first turbine rotor 100 is coupled to the first shaft 36 toward the downstream end 98 of the engine 10. The first compressor 22 and fan assembly 14 are driven by the first turbine rotor 100. The second compressor 24 is coupled to a second shaft 34 and a second turbine rotor 120 is coupled to the second shaft 34 toward the downstream end 98 of the engine 10. The second compressor 24 is driven by the second turbine rotor 120. In various embodiments, the first compressor 22 defines a low pressure (LP) compressor and the second compressor 24 defines a high pressure (HP) compressor. In still various embodiments, the first turbine rotor 100 may define a low speed turbine 30 and the second turbine rotor 120 may define a high speed turbine 28.

In other embodiments, the engine 10 may define a three-spool configuration in which the compressor section 21 defines a fan assembly 14 including a fan rotor 15, and the first compressor 22 and the second compressor 24. A third turbine rotor 130 (FIG. 2) may define an intermediate speed turbine driving the first compressor 22 defining an IP compressor. The first turbine rotor 100 defining the low speed turbine 30 is attached to the fan rotor 15, thus driving the fan assembly 14. In such an embodiment, the third turbine rotor 130 may be disposed in interdigitation among the first turbine rotor 100 in addition to or in lieu of the second turbine rotor 120 defining the high speed turbine 28.

Referring back to FIG. 1, the fan assembly 14 includes at least one stage of a plurality of fan blades 42 coupled to the fan rotor 15. The plurality of fan blades 42 are coupled to and extend outwardly from the fan rotor 15 in the radial direction R. In various embodiments, the fan rotor 15 may include a plurality of stages of fan blades 42 along the longitudinal direction L. An annular fan casing or nacelle 44 circumferentially surrounds at least a portion of the fan assembly 14 and/or at least a portion of the outer casing 18. In one embodiment, the nacelle 44 may be supported relative to the outer casing 18 by a plurality of circumferentially-spaced outlet guide vanes or struts 46. At least a portion of the nacelle 44 may extend over an outer portion (in radial direction R) of the outer casing 18 so as to define a bypass airflow passage 48 therebetween.

In other embodiments, the fan assembly 14 may further include a power or reduction gearbox disposed between the fan rotor 15 and a first shaft 36 coupled to the turbine section 90. The gearbox may reduce the rotational speed of the fan rotor 15 relative to the turbine rotor of the turbine section 90 to which the fan rotor 15 is attached via the first shaft 36.

Figure 2:
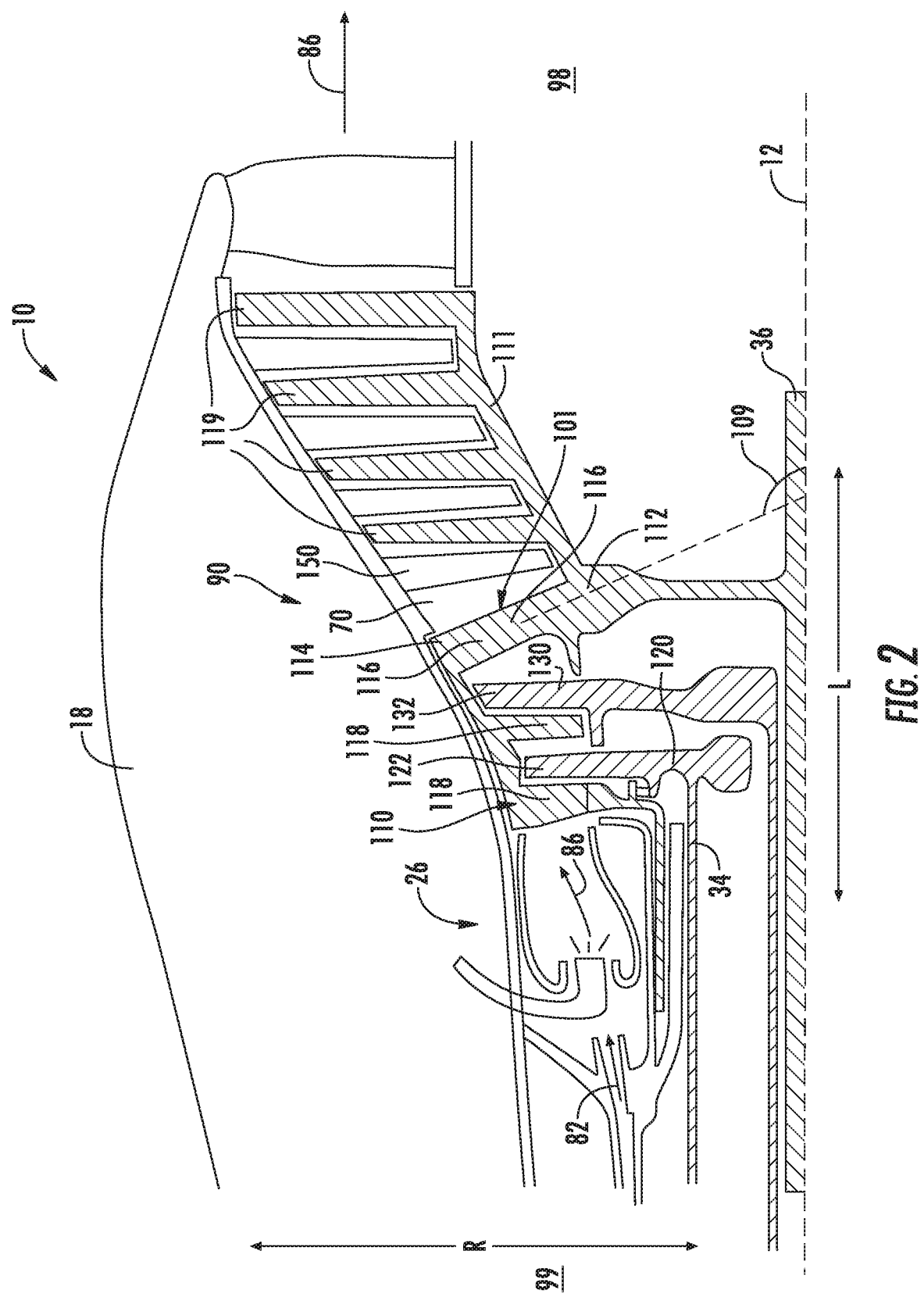
FIG. 2 is a schematic cross sectional view of an embodiment of the turbine section shown in FIG. 1.

Referring now to FIG. 2, an exemplary embodiment of the turbine section 90 of the engine 10 is generally provided. The turbine section 90 includes the first turbine rotor 100 including a rotatable torque frame 101. As shown in further detail in the various embodiments generally provided in FIGS. 3-12, the torque frame 101 includes an inner shroud 112, an outer shroud 114, and at least one structural member 116 coupling the inner shroud 112 to the outer shroud 114. In various embodiments, an outer drum rotor 110 is extended along the longitudinal direction L from the torque frame 101. The outer drum rotor 110 includes a plurality of outer drum airfoils 118 extended inward along the radial direction R. In various embodiments, such as shown in FIGS. 1-2, the inner shroud 112 may be coupled to an inner drum rotor 111 extended along the longitudinal direction L. The inner drum rotor 111 includes a plurality of inner drum airfoils 119 extended outward along the radial direction R.

In various embodiments, such as generally provided in FIGS. 1-2, the inner drum rotor 111 is extended from the inner shroud 112 at the structural member 116 toward the downstream end 98 along the longitudinal direction L. In still various embodiments, the outer drum rotor 110 is extended from the structural member 116 toward the upstream end 99 along the longitudinal direction L toward the combustion section 26, such as generally provided in FIGS. 1-2 and FIGS. 11-12. In still another embodiment, such as generally provided in FIG. 12, the outer drum rotor 110 may be extended toward the upstream end 99 and toward the downstream end 98 from the torque frame 101.

Referring still to FIG. 2, the turbine section 90 may further include a second turbine rotor 120 disposed forward or upstream 99 of the one or more structural members 116 of the outer drum rotor 110. The second turbine rotor 120 includes a plurality of second airfoils 122 extended outward along the radial direction R. In various embodiments, the second turbine rotor 120 is disposed forward or upstream 99 of the structural members 116 and in interdigitation with the outer drum rotor 110. For example, as shown in FIG. 1, the engine 10 and turbine section 90 may define, in serial flow arrangement from the upstream end 99 to the downstream end 98, the plurality of outer drum airfoils 118 of the outer drum rotor 110, the plurality of second airfoils 122 of the second turbine rotor 120, the one or more structural members 116 of the torque frame 101, and one or more stages of the plurality of inner drum airfoils 119. In various embodiments, the turbine section 90 may define a plurality of iterations of the plurality of outer drum airfoils 118 alternating with the plurality of second airfoils 122 along the longitudinal direction L. In one embodiment, the first turbine rotor 100 may define between one and ten rotating stages, inclusively. For example, the torque frame 101 may define the outer shroud 114, the inner shroud 112, and the structural members 116 as at least one stage. In another embodiment, the first turbine rotor 100 may define between three and ten rotating stages, inclusively. In one embodiment, the second turbine rotor 120 may define at least one rotating stage in interdigitation (i.e., spaced in alternating arrangement along the longitudinal direction L) with the plurality of outer drum rotor airfoils 118 coupled to and extended from the outer drum rotor 110.

Referring back to FIG. 2, the engine 10 may further include the third turbine rotor 130 rotatable independently of the second turbine rotor 120. The third turbine rotor 130 includes a plurality of third turbine airfoils 132 in interdigitation with the outer drum rotor 110. Although not depicted in FIG. 1, it should be understood that one or more rotating stages of the second turbine rotor 120 depicted in FIG. 1 may alternatively be defined as the third turbine rotor 130 such as shown in FIG. 2, in which the third turbine rotor 130 drives a third compressor (not shown) in the engine 10.

Referring back to FIGS. 1-2, during operation of the engine 10 a volume of air as indicated schematically by arrows 74 enters the engine 10 through an associated inlet 76 of the nacelle and/or fan assembly 14. As the air 74 passes across the fan blades 42, a portion of the air as indicated schematically by arrows 78 is directed or routed into the bypass airflow passage 48 while another portion of the air as indicated schematically by arrows 80 is directed through the fan assembly 14 and through the inlet 20. The air 80 is progressively compressed as it flows through the compressor section 21 toward the combustion section 26.

The now compressed air, as indicated schematically by arrows 82, flows into the combustion section 26 where a fuel is introduced, mixed with at least a portion of the compressed air 82, and ignited to form combustion gases 86. The combustion gases 86 flow into the turbine section 90, causing the first turbine rotor 100 and second turbine rotor 120, and in various embodiments, the third turbine rotor, of the turbine section 90 to rotate and support operation of respectively coupled rotary members in the compressor section 21 and/or fan assembly 14.

Figure 3:
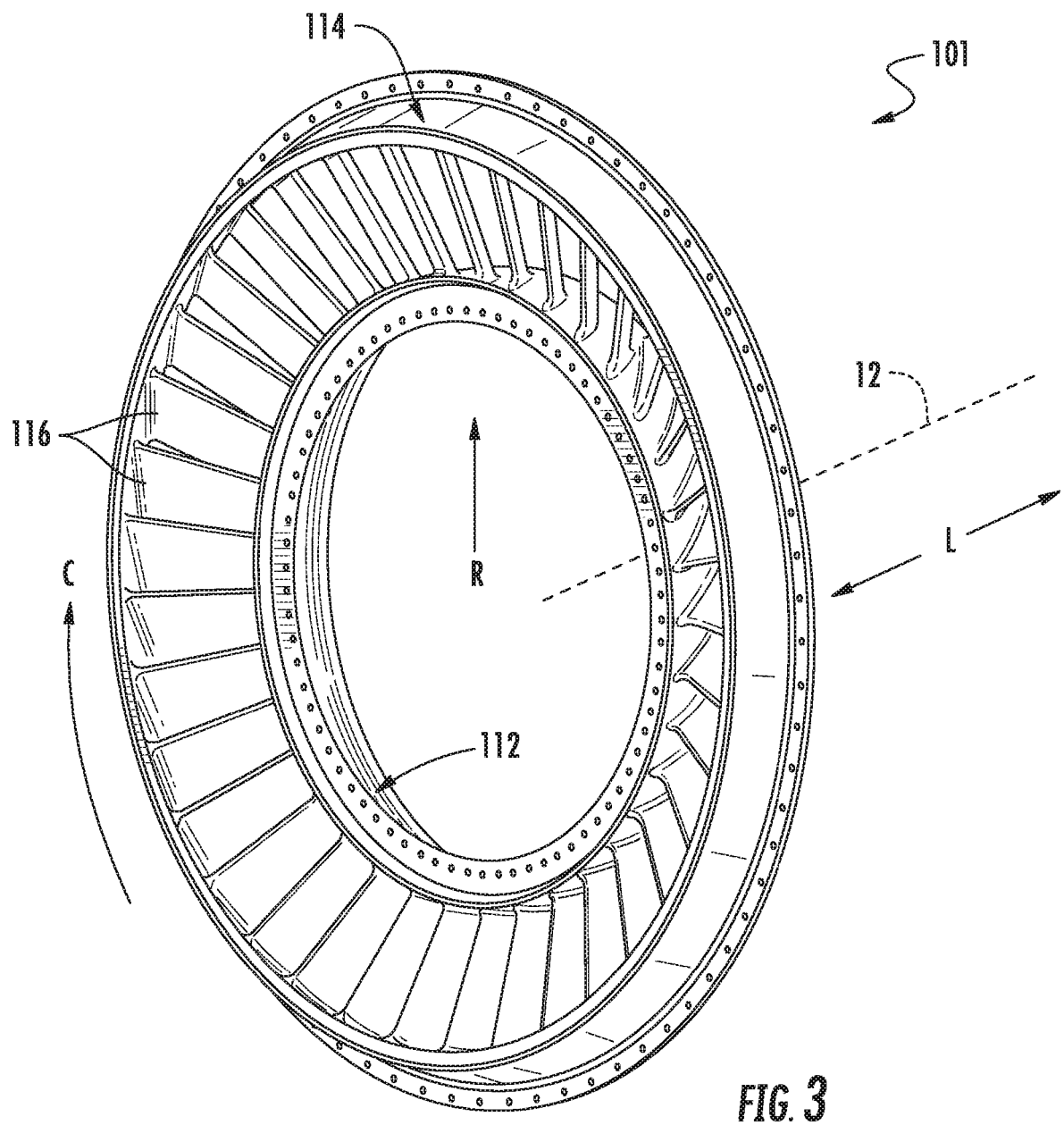
FIGS. 3-4 are perspective views of exemplary embodiments of a torque frame of the turbine section generally provided in FIGS. 1-2.

Referring now to FIG. 3, an exemplary embodiment of the torque frame 101 is generally provided. The torque frame 101 includes an inner shroud 112 and an outer shroud 114 outward of the inner shroud 112 in the radial direction R. At least one structural member 116 couples the inner shroud 112 and the outer shroud 114 at least partially in the radial direction R.

In various embodiments, the structural members 116 each define an airfoil defining a pressure side, a suction side, a leading edge, and a trailing edge. The structural member 116 defining the airfoil is generally configured to enable rotation of the torque frame 101. For example, the torque frame 101, as a portion of the first turbine rotor 100, is configured to rotate along the axial centerline 12, such as in a first direction at a first speed co-rotational with the outer drum rotor 110 and the inner drum rotor 111.

Referring back to FIG. 2, the structural member 116 may define a lean angle 109 relative to the axial centerline 12 and the radial direction R In one embodiment, such as shown in FIG. 2, the lean angle 109 is defined in which an outer radius of the structural member 116 is disposed upstream of an inner radius of the structural member 116. For example, the lean angle 109 may be defined as approximately 90 degrees or greater relative to the axial centerline 12. In another embodiment, the lean angle 109 is less than approximately 180 degrees relative to the axial centerline 12. In still various embodiments, the lean angle 109 may be approximately 90 degrees or perpendicular relative to the axial centerline 12.

In the embodiment shown in FIG. 3, the structural member 116 may define an obtuse or forward lean angle 109 in which the structural member 116 is extended toward the upstream end 99 from the inner shroud 112 (i.e. radially inward end of the structural member 116 is further downstream than a radially outward end). The obtuse or forward lean angle 109 may counteract or offset centrifugal loads on the torque frame 101 during rotation of the turbine section 90. The obtuse lean angle 109 may enable the structural member 116 to counteract or offset axial loads during operation of the engine 10, such as due to rotation of the first turbine rotor 100 including the torque frame 101 and one or more of the outer drum rotor 110 and the inner drum rotor 111. The obtuse lean angle 109 may further enable the structural member 116 to counteract or offset axial loads resulting from the flow of combustion gases 86 through the core flowpath 70.

However, in the embodiment shown in FIG. 2, the structural members 116 and/or the outer shroud airfoils 118 may each define a generally perpendicular or acute lean angle 109 in which one or more of the structural members 116 and/or the outer shroud airfoils 118 extend generally radially outward from the axial centerline 12 or toward the upstream end 99 (i.e. radially inward ends of the airfoils 116, 118 are approximately equal to or further upstream than radially outward ends).

As further described herein, the torque frame 101 is configured to extract work or energy from the combustion gases 86 to enable rotation of the torque frame 101, the outer drum rotor 110, and the inner drum rotor 111. Still further, the torque frame 101, such as the structural members 116, is configured to transfer reaction loads from combustion gases 86 within the core flowpath 70 of the engine 10, such as loads along the longitudinal direction L The structural members 116 further transfer loads along the radial direction R and the circumferential direction C from the inner shroud 112, and the inner drum rotor 111 attached thereto, and the outer shroud 114, and the outer drum rotor 110 attached thereto.

Figure 4:
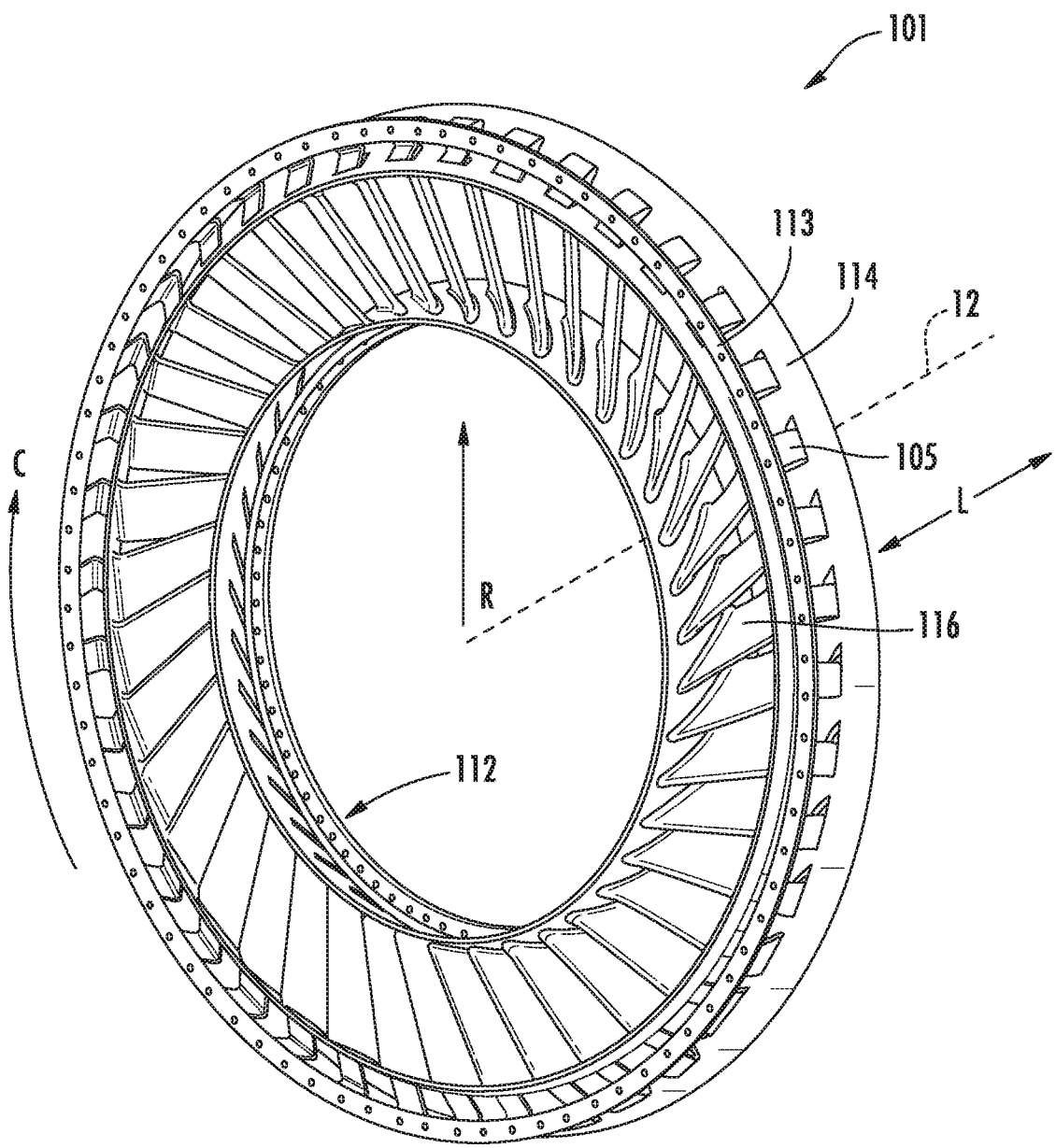

Referring now to the exemplary embodiment of the torque frame 101 provided in FIG. 4, an outer band 113 is coupled to the outer shroud 114 and disposed outward in the radial direction R thereof. The outer band 113 is extended at least partially in the circumferential direction C. In various embodiments, the outer band 113 extends annularly around the outer shroud 114 of the torque frame 101. The outer band 113 coupled to the outer shroud 114 further provides structural support, such as defining an annular ring surrounding the outer shroud 112 to which the outer drum rotor 110 is coupled and extended along the longitudinal direction L. In still various embodiments, the torque frame 101 further includes connecting members 105 (shown in FIGS. 4-12) extended at least partially along the radial direction coupling the outer shroud 114 to the outer band 113. The connecting members 105 may further transfer loads from the inner shroud 112 and inner drum rotor 111, the structural members 116, and the outer shroud 114 and outer drum rotor 110 to the outer band 113.

The torque frame 101 including the connecting members 105 and the outer band 113 may together define a structural support for the outer drum rotor 110 that may enable the outer drum rotor 110 to be overhung or cantilevered. The connecting members 105 may define springing properties configured to attenuate undesired engine dynamics. The connecting members 105 may further provide radial growth, movement, or displacement of the structural members 116 while the outer band 113 provides structural stiffness. The connecting members 105 may transfer thermal and mechanical loads, such as loads along the axial or longitudinal direction L, loads along the radial direction R, and/or twisting, bending, vibrational, or torsional loads along the longitudinal direction L, the radial direction R, and/or the circumferential direction C. Still further, the connecting members 105 may attenuate the high temperature gradient within a secondary flowpath 69 defined between the outer shroud 114 and outer drum rotor 110 and the outer band 113.

In various embodiments, during operation of the engine 10, the connecting members 105 from the outer shroud 114 to the outer band 113 may transfer thermal, axial, radial, and mechanical loads to the outer band 113 while providing adequate radial stiffness to support an overhung or cantilevered outer drum rotor 110 for the interdigitated turbine section 90. Still further, the outer band 113 may provide sufficient stiffness to attenuate undesired vibratory modes, harmonics, or noise and/or generally promote desired engine dynamics.

For example, the torque frame 101 may further enable interdigitation of the outer drum rotor 110 with the second turbine rotor 120, including forward or upstream of the second turbine rotor 120 (e.g., a high pressure or high speed turbine rotor) to enable the outer drum rotor 110 (e.g., as a low speed turbine rotor) to be immediately downstream of the combustion section 26. As such, the torque frame 101 may obviate the need or presence of a first turbine vane or nozzle downstream of the combustion section 26, thereby improving turbine section 90 performance and/or efficiency, engine 10 performance, operability, and/or efficiency, and/or reduce weight, part count, and/or packaging (e.g. longitudinal and/or radial dimensions) of the engine 10. In still various embodiments, the torque frame 101 may provide structural support enabling the overhung or cantilevered outer drum rotor 110 and the inner drum rotor 111 extended at least partially in an opposite direction along the longitudinal direction L.

Figure 5:
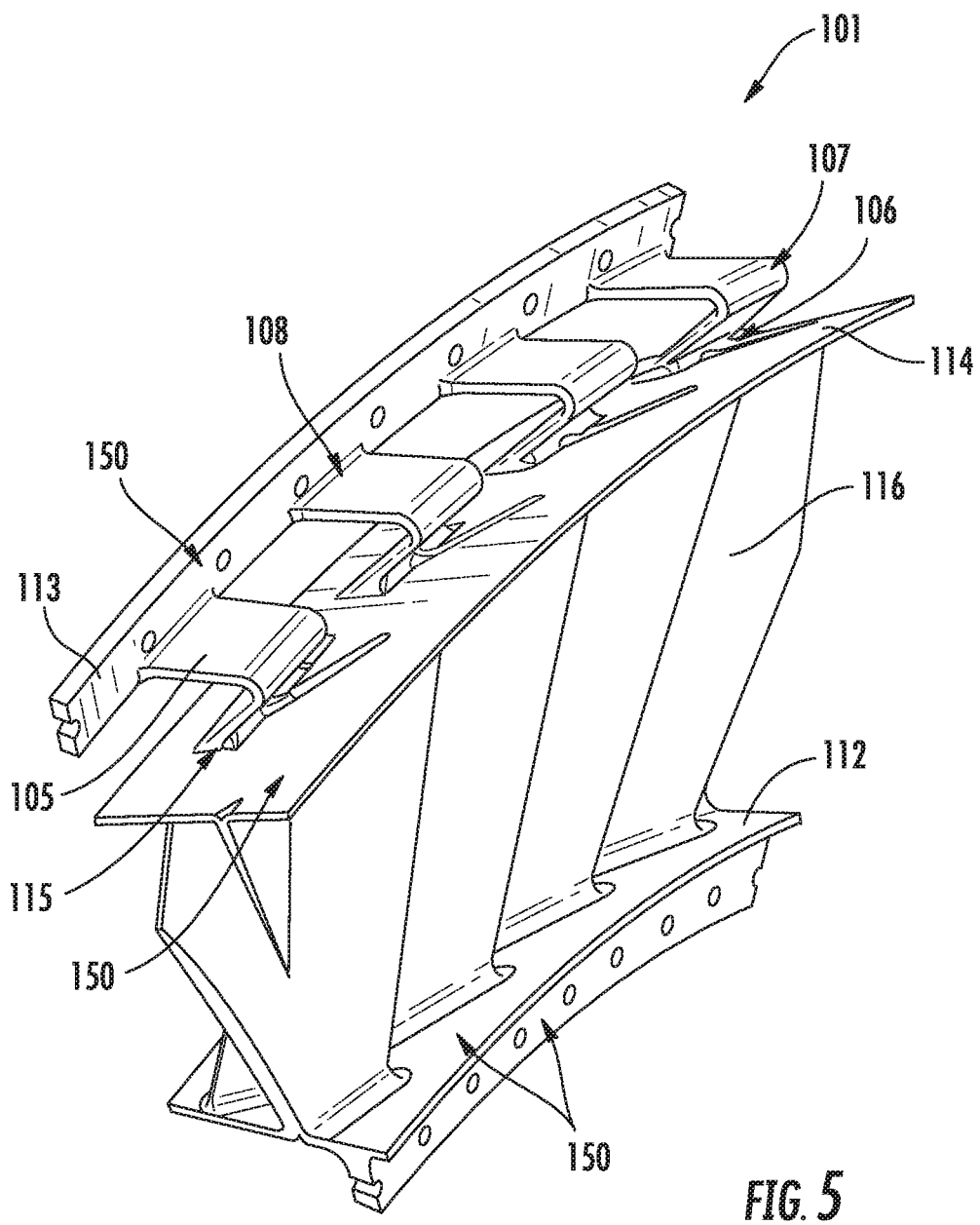
FIG. 5 is a perspective view of a portion of an exemplary embodiment of a torque frame of the turbine section generally provided in FIGS. 1-2.

Referring now to FIG. 5, a perspective view of a portion of the exemplary embodiment of the torque frame 101 shown in FIG. 4 is generally provided. In the embodiment shown in FIG. 5, each connecting member 105 may define a first end 106 proximate or adjacent to the outer shroud 114 (e.g. along an outer diameter of the outer shroud 114). Each connecting member 105 may further define a second end 108 proximate or adjacent to the outer band 113 (e.g. along an inner diameter of the outer band 113). Each connecting member 105 may further define a middle portion 107 between the first end 106 and the second end 108.

In various embodiments, one or more of the connecting members 105 may define various thicknesses. For example, one or more of the connecting members 105 may define a first thickness disposed at about the first end 106 and/or the second end 108 and a second thickness disposed within at least a portion of the middle portion 107 therebetween. In another example, the middle portion 107 of one or more of the connecting members 105 may increase and/or decrease in thickness between the first end 106 and the second end 108. In still another example, each connecting member 105 may define different or alternating thicknesses between the first end 106 and the second end 108. In various embodiments, a plurality of thicknesses or definitions may be employed to attenuate of the thermal gradient along the secondary flowpath 69, attenuate undesired vibratory modes, promote structural rigidity or flexibility as desired, and/or promote structural support for the outer drum rotor 110 in interdigitation with the second turbine rotor 120. Still further, the outer band 113, the connecting members 105, or both may provide sufficient stiffness to attenuate undesired vibratory modes, harmonics, or noise and/or generally promote desired engine dynamics.

Figure 6:
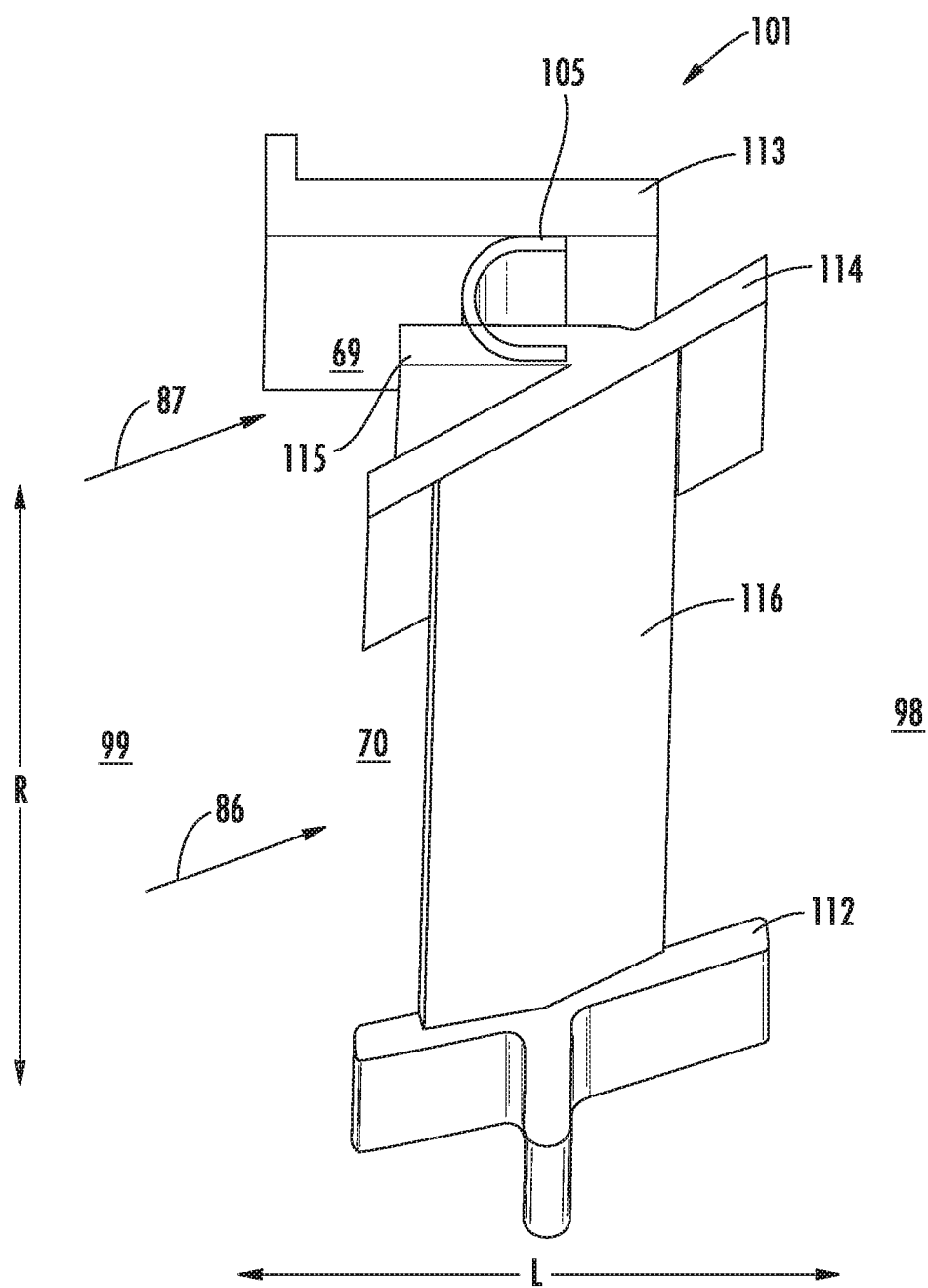
FIGS. 6-7 are side views of exemplary embodiments of the torque frame generally provided in FIG. 5.
Figure 7:
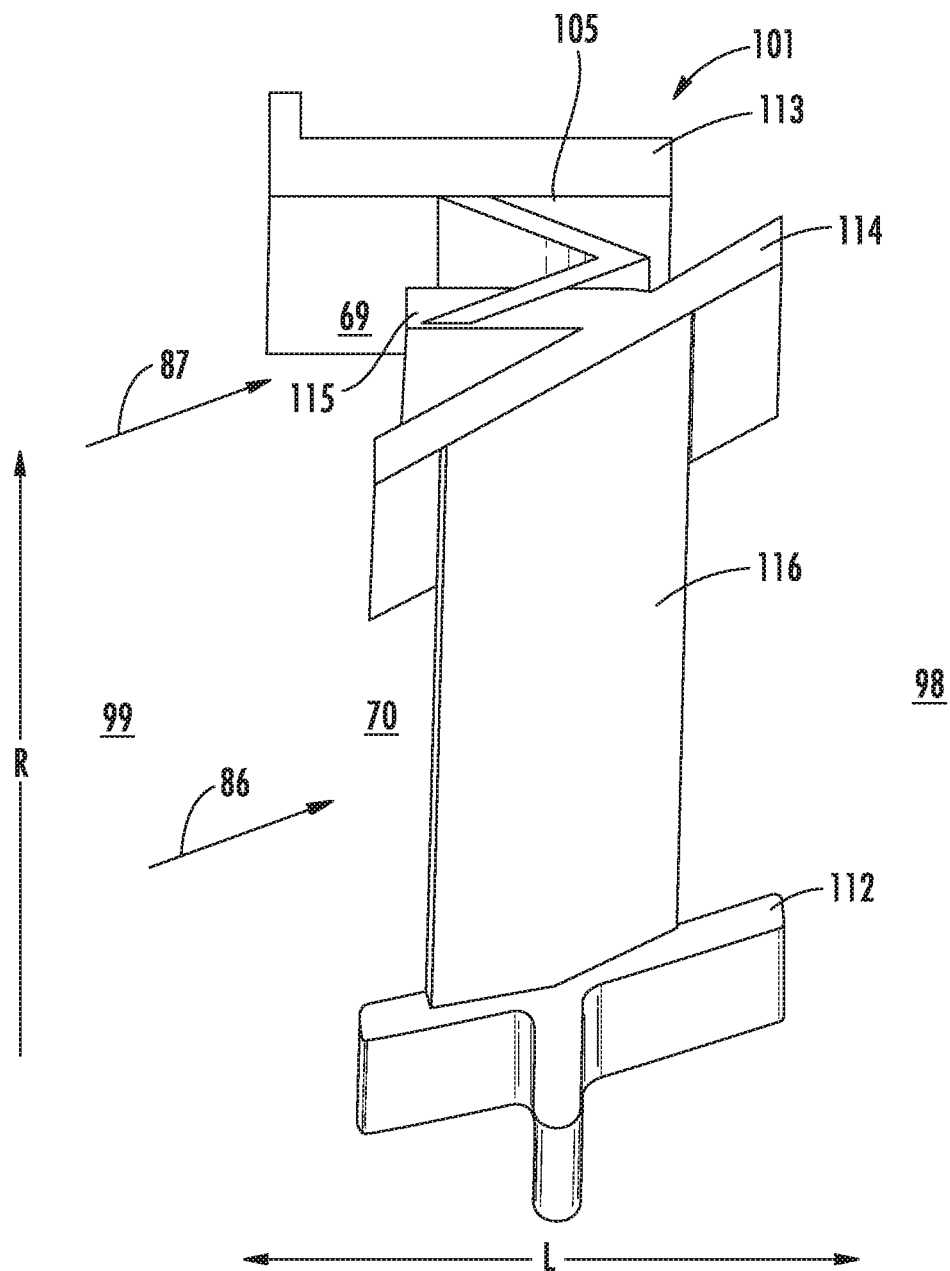

Referring now to FIGS. 6-7, side views along the longitudinal direction L of exemplary embodiments of the torque frame 101 shown in FIGS. 4-5 are generally provided. Referring to FIGS. 4-7, the outer shroud 114 may further define a platform 115 extended at least partially along the longitudinal direction L (as shown in FIGS. 6-7) and at least partially along the circumferential direction C (as shown in FIGS. 4-5). The connecting members 105 extend from the platform 115 to the outer band 113. In various embodiments, the platform 115 may define a wall extended generally concentric and generally parallel with the outer band 113. The generally concentric and generally parallel platform 115 may provide a surface from or against which the connecting members 105 transfer force or torque substantially along the radial direction R. For example, the connecting members 105 may transfer radial loads from the structural member 116 that may be induced during rotation of the torque frame 101 during operation of the engine 10. The connecting members 105 may further permit radial growth due to thermal expansion of the structural members 116 as combustion gases 86 flow across the structural members 116.

Referring to the exemplary embodiment of the torque frame 101 shown in FIG. 6, the connecting members 105 may generally define a "C" cross section. The connecting member 105 may define springing properties, e.g., compression or tension at least along the radial direction R. Referring to the exemplary embodiment shown in FIG. 7, the connecting members 105 may generally define a spring (e.g., a "V": or zig-zag cross section such as shown in FIGS. 5 and 7, the "C" cross section such as shown in FIG. 6), such as to absorb movement, displacement, or growth of along the radial direction R, axial or longitudinal direction L, and/or circumferential direction C of the torque frame 101, including the structural members 116.

Figure 8:
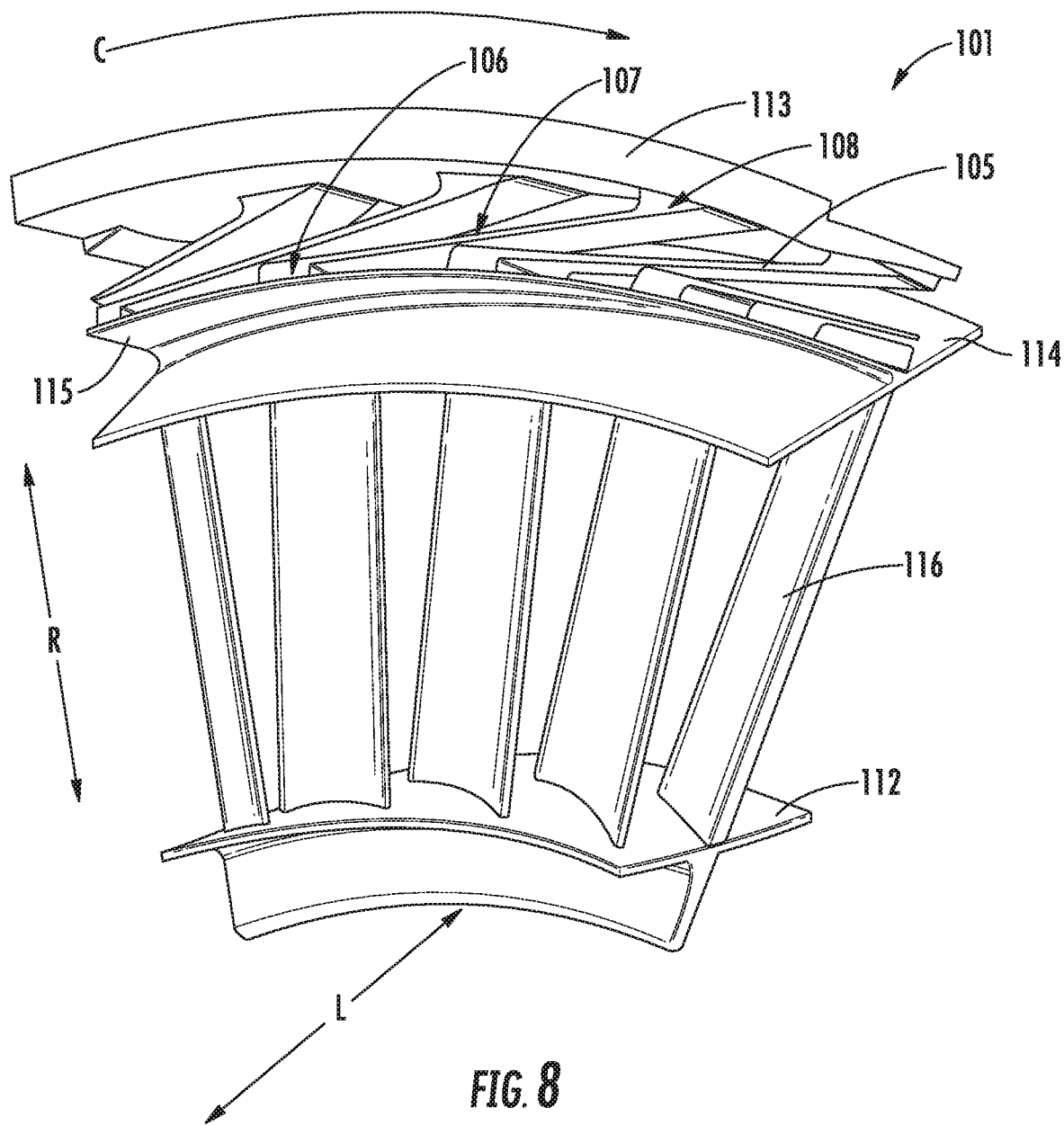
FIGS. 8-9 are perspective views exemplary embodiments of a portion of the torque frame generally provided in FIG. 5.
Figure 9:
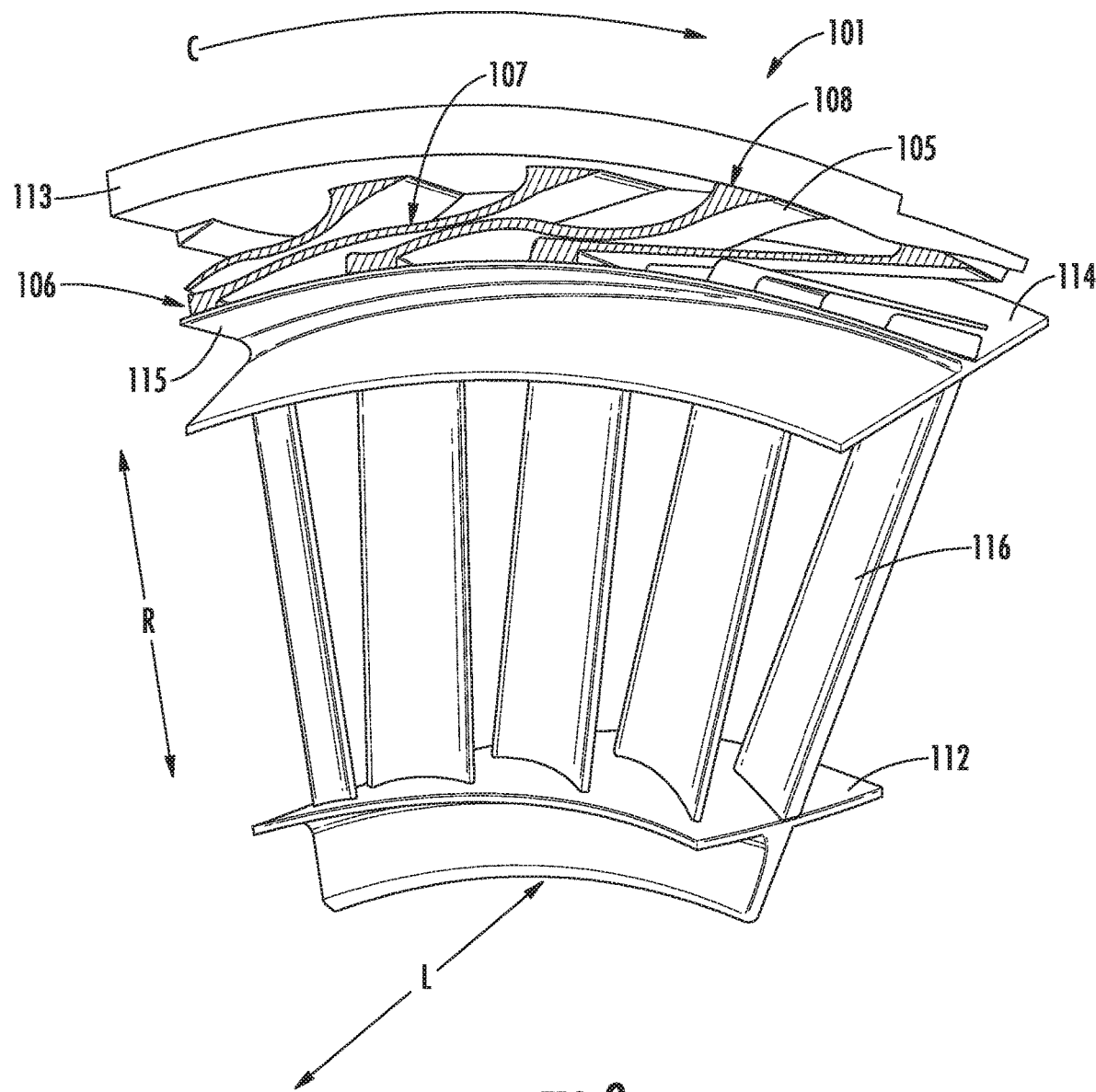

Referring now to the perspective views of exemplary embodiments of the torque frame 101 generally provided in FIGS. 8-9, the connecting members 105 may extend at least partially tangentially from the outer shroud 114 to the outer band 113. In the embodiment shown in FIG. 8, the connecting members 105 extend generally straight along the circumferential direction C or tangential direction from the outer shroud 114 to the outer band 113. In the embodiment shown in FIG. 9, the connecting members 105 at least partially define a serpentine structure. For example, the serpentine structure may define a waveform in the middle portion 107 of one or more of the connecting members 105.

Figure 10:
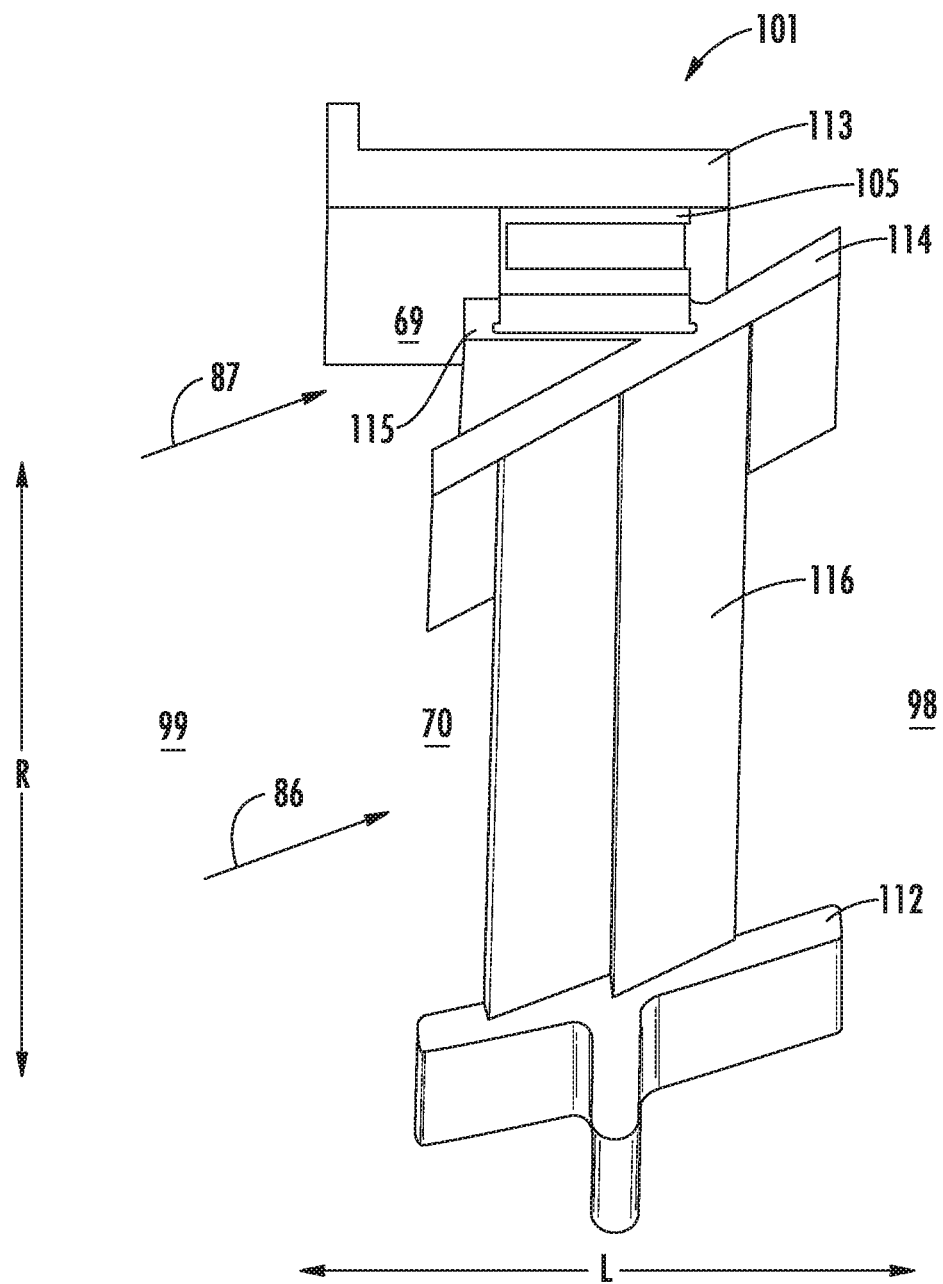
FIG. 10 is a side view of the exemplary embodiments of the torque frame generally provided in FIGS. 8-9.

FIG. 10 generally provides a side view of the embodiments of the torque frame 101 generally provided in FIGS. 8-9. The side view generally provided is configured substantially similarly to the embodiments shown and described in regard to FIGS. 6-7.

Referring to FIGS. 8-10, in one embodiment, the torque frame 101 may define a plurality of connecting members 105 defining combinations of generally straight and partially serpentine middle portions 107. For example, the connecting members 105 may define an alternating combination of generally straight and serpentine middle portions 107. As another example, the connecting members 105 of the torque frame 101 may define an alternating combination of generally straight and serpentine middle portions 107, and alternating combinations of various thicknesses of middle portions 107.

Referring now to FIGS. 3-10, in various embodiments the outer band 113 may define an annular ring generally concentric about the axial centerline 12 of the engine 10 (shown in FIG. 1). In one embodiment, the outer band 113 defines a solid annular ring. The outer band 113 may define strength and material properties for absorbing mechanical and thermal loads from the inner shroud 112, the structural members 116, the outer band 114, and the connecting members 105. In another embodiment, the outer band 113 defines a segmented ring in which a plurality of segments are adhered together via mechanical fasteners, such as, but not limited to, bolts, nuts, nut plates, screws, rivets, or pins, or one or more joining processes, such as welding, soldering, or brazing.

Referring back to FIG. 5, in still various embodiments, the outer band 113 may define one or more balance planes 150. In one embodiment, the balance plane 150 is defined at one or more orifices, such as through which a fastener is installed to couple a balance weight to the outer band 113. The orifices may further define where the outer drum rotor 110 is coupled to the outer band 113. The balance weight may be a specially weighted fastener or a weight coupled to the fastener.

In another embodiment, the balance plane 150 is defined on the outer band 113 as an area at which material is removed or added to alter rotor balance. For example, the balance plane 150 may define an area at which material is removed, such as via grinding or cutting. As another example, the balance plane 150 may define an area at which material is added, such as via welding, strapping, etc. The balance plane 150 may further be defined at one or more of the outer shroud 114 or the inner shroud 112. In various embodiments, one or more of the outer band 113, the outer shroud 114, and the inner shroud 112 may define one or more locations onto which a weight is adhered (e.g. mechanical fasteners, joining processes, or retention clip) to achieve a desired static and/or dynamic balance of the first turbine rotor 100 including the torque frame 101.

Figure 11:
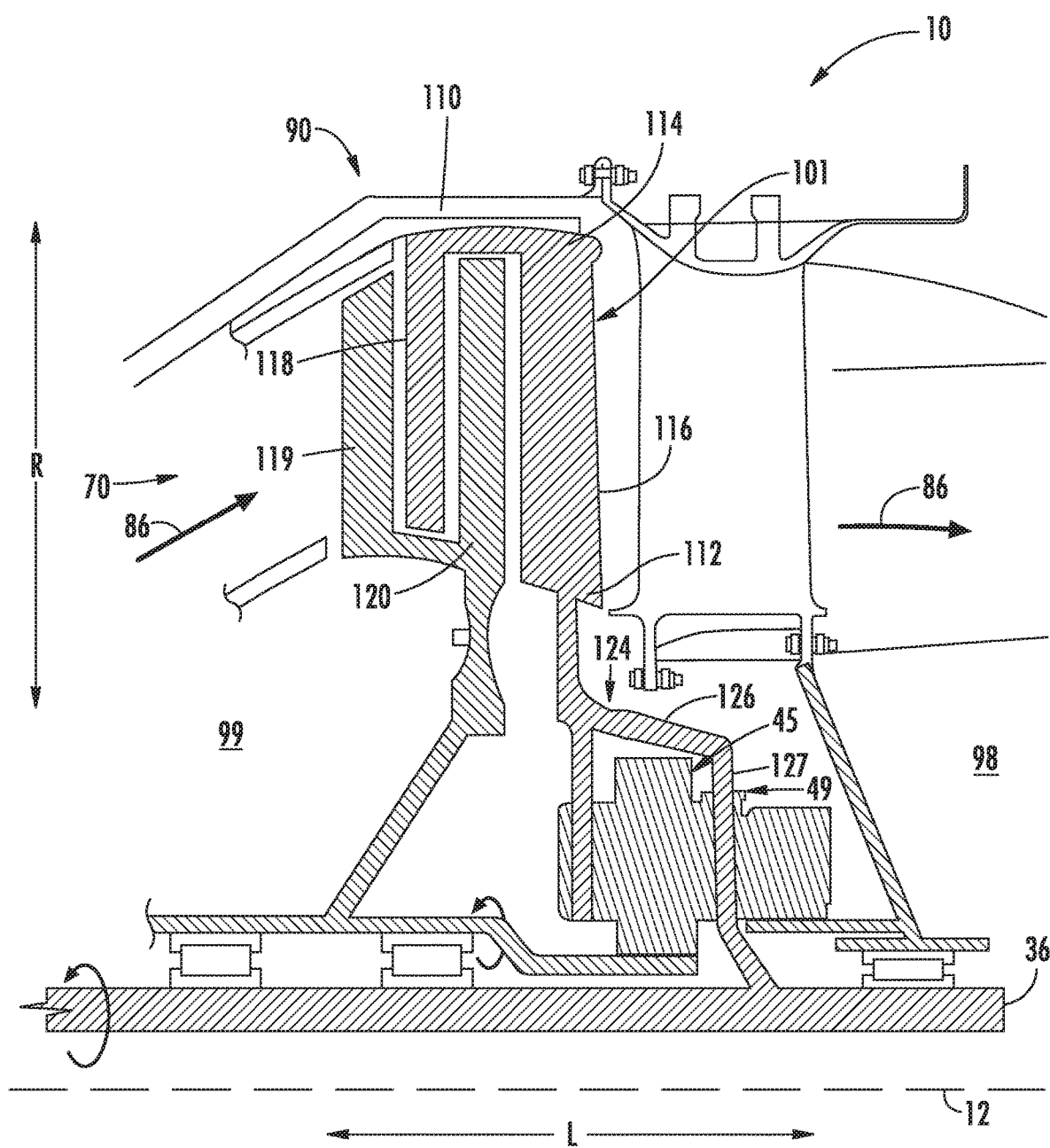
FIGS. 11-12 are schematic cross sectional views of embodiments of the turbine section shown in FIG. 1.
Figure 12:
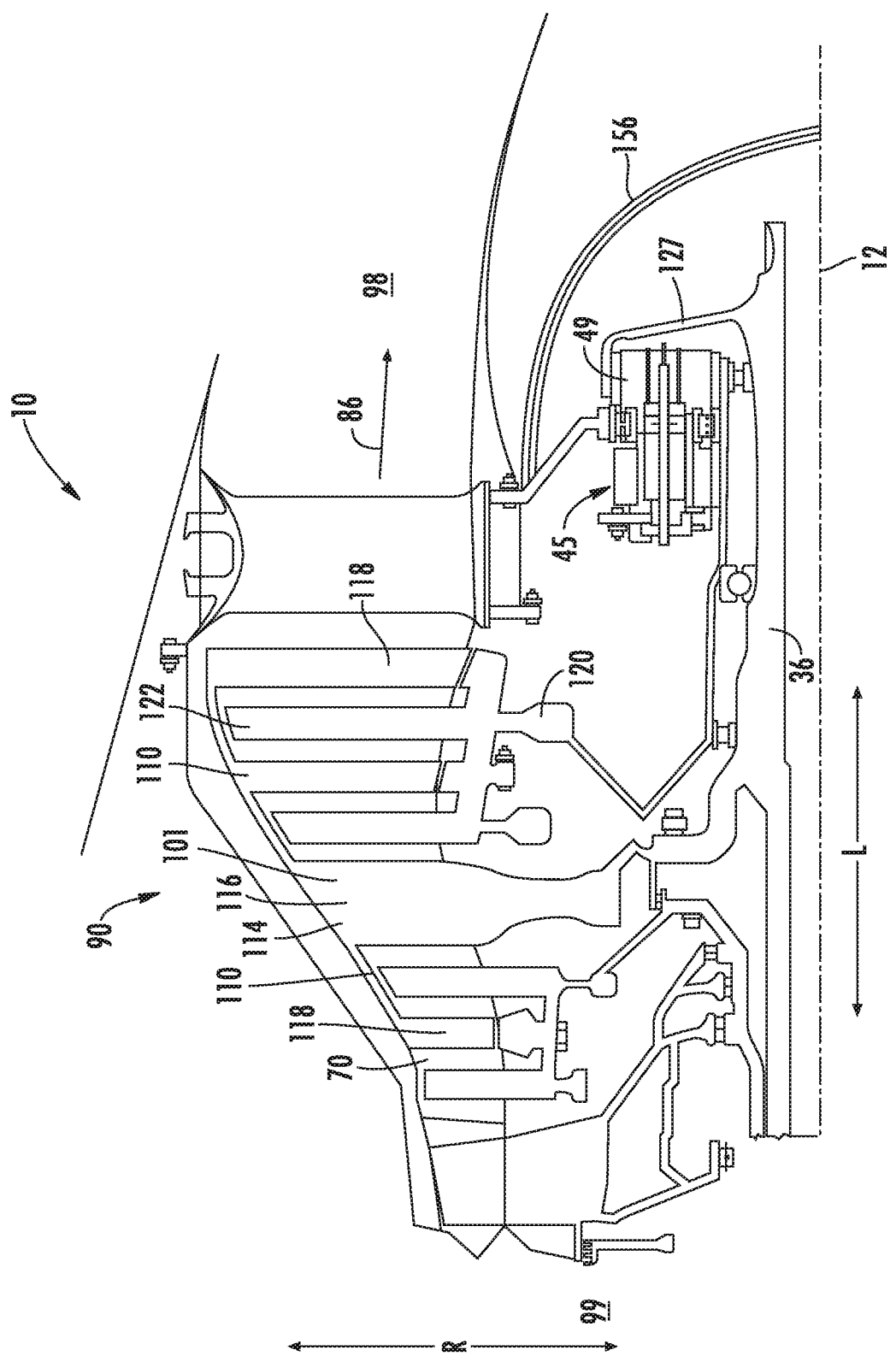

Referring now to FIGS. 11-12, exemplary embodiments of the turbine section 90 including the rotatable torque frame 101 are generally provided. The turbine section 90 and the torque frame 101 are configured substantially similarly as shown and described in regard to FIGS. 1-10. In the embodiments generally provided in FIGS. 11-12, the torque frame 101 is further coupled to the first shaft 36. The first shaft 36 is extended along the longitudinal direction L and coupled to the fan assembly 14 (FIG. 1). As such, the torque frame 101 may further extract energy from the combustion gases 86 within the core flowpath 70 as well as provide structural support and load transfer from the outer drum rotor 110 and provide energy to drive the fan assembly 14 coupled to the first shaft 36.

In the embodiment generally provided in FIG. 11, the torque frame 101 is further coupled to a rotatable housing 124 surrounding a speed reduction assembly 45. The housing 124 generally includes an axial portion 126 and a radial portion 127. The radial portion 127 is coupled to an output component 49 of the speed reduction assembly 45. The radial portion 127 is further coupled to the first shaft 36 that is coupled at an opposing end to the fan assembly 14 (FIG. 1).

In the embodiment generally provided in FIG. 12, the first shaft 36 is further coupled to the output component 49 of the speed reduction assembly 45. Referring to FIGS. 11-12, as well as the various embodiments of the torque frame 101 shown and described in regard to FIGS. 3-10, the torque frame 101 further supports load transfers from the speed reduction assembly 45, the first shaft 36, and the fan assembly 14 (FIG. 1). As such, the torque frame 101 is further configured to react to loads and attenuate dynamics resulting from the aforementioned assemblies.

Referring still to FIGS. 3-12, at least a portion of the torque frame 101, the inner drum rotor 111 and/or outer drum rotor 110 may define an integrally formed structure. The structure may be formed of various processes, such as, but not limited to, additive manufacturing or 3D printing. The integrally formed structure may additionally, or alternatively, include one or more casting, forging, and/or machining processes. In one embodiment, the one or more structural members 116, the inner shroud 112, and the outer shroud 114 may together define an integral structure. In another embodiment, the one or more structural members 116, the inner shroud 112, the outer shroud 114, the plurality of connecting members 105, and the outer band 113 together define an integral structure. In still other embodiments, one or more of the structural members 116, the inner shroud 112, the outer shroud 114, the connecting members 105, and/or the outer band 113 may be adhered to one another via one or more mechanical fasteners and/or joining processes, independently of or in conjunction with one or more integrally defined structures.

The turbine section 90, including the torque frame 101, the outer drum rotor 110, the inner drum rotor 111, the second turbine rotor 120, or individual stages thereof, may be formed of ceramic matrix composite (CMC) materials and/or metals appropriate for gas turbine engine hot sections, such as, but not limited to, nickel-based alloys, cobalt-based alloys, iron-based alloys, or titanium-based alloys, each of which may include, but are not limited to, chromium, cobalt, tungsten, tantalum, molybdenum, and/or rhenium. The turbine section 90, or portions or combinations of portions thereof, may be formed using additive manufacturing or 3D printing, or casting, forging, machining, or castings formed of 3D printed molds, or combinations thereof. The turbine section 90, or portions thereof, may be mechanically joined using fasteners, such as nuts, bolts, screws, pins, or rivets, or using joining methods, such as welding, bonding, friction or diffusion bonding, etc., or combinations of fasteners and/or joining methods. The outer drum rotor 110, the inner drum rotor 111, and/or the second turbine rotor 120, including individual stages thereof, may be constructed as individual blades installed into drums or hubs, or integrally bladed rotors (IBRs) or bladed disks, or combinations thereof.

The turbine section 90 shown and described herein may improve upon existing turbine sections by providing improved fuel efficiency, operational efficiency, and/or power output while maintaining or reducing weight, part count, and/or packaging. The plurality of outer drum airfoils 118 interdigitated among the second turbine rotor(s) 120 may reduce packaging and reduce part count by removing stages of stationary airfoils between each rotating component. Additionally, the turbine section 90 may provide efficiency benefits comparable to a reduction gearbox without adding weight or size (e.g. axial length) to the engine 10. The outer drum rotor 110, as a first stage downstream of the combustion section 26, may further improve engine efficiency by removing design constraints to the combustion section 26 that may account for combustor hot spots. Furthermore, the turbine section 90 may improve engine 10 efficiency by reducing requirements for cooling air, generally extracted from the compressor section 21 and often considered to remove potential propulsive energy from the engine 10.

Still further, the torque frame 101 including the outer band 113 and the connecting members 105, may provide structural support responsive to axial, radial, torsional, thermal, or other mechanical loads that may enable an overhung or cantilevered outer drum rotor 110 interdigitated with a plurality of stages of the second turbine rotor 120. Furthermore, the structural support of the torque frame 101 may enable the outer drum rotor 110 to overhang forward or upstream of the second turbine rotor 120 defining a HP turbine. Alternatively, the torque frame 101 may enable the outer drum rotor 110 to overhang forward or upstream to dispose the plurality of outer drum airfoils 118 immediately downstream of the combustion section 26 (i.e. in lieu of or obviating the placement of a first turbine vane or nozzle).

In various embodiments, the first turbine rotor 100 including the torque frame 101 may define at least two stages of airfoils, including a stage of the structural members 116, such as defining rotating airfoils including a pressure side and a suction side, and one or more stages of the outer drum airfoils 118. In still another embodiment, the first turbine rotor 100 may define at least 3 stages of airfoils, including a stage of the structural members 116 of the torque frame, one or more stages of the outer drum airfoils 118, and one or more stages of the inner drum airfoils 119. In various embodiments, the torque frame 101 provides thermal gradient attenuation, thereby mitigating deleterious effects of the gases 87 within the secondary flowpath 69.

The systems shown in FIGS. 1-12 and described herein may decrease fuel consumption, increase operability, increase engine performance and/or power output while maintaining or reducing weight, part count, and/or packaging (e.g. radial and/or axial dimensions). The systems provided herein may allow for increased bypass ratios and/or overall pressure ratios over existing gas turbine engine configurations, such as turbofans, while maintaining or reducing packaging relative to other gas turbine engines of similar power output. The systems described herein may contribute to improved bypass ratio and/or overall pressure ratio and thereby increase overall gas turbine engine efficiency. The systems provided herein may increase overall gas turbine engine efficiency by reducing or eliminating stationary airfoils that require cooling air (e.g. nozzle guide vane). Additionally, the systems provided herein may reduce gas turbine engine packaging and weight, thus increasing efficiency, by reducing rotating and/or stationary airfoil quantities (e.g. blades and/or vanes).

Still further, the systems shown in FIGS. 1-12 and described herein may reduce a product of a flow area and the square of the rotational speed (the product herein referred to as "$AN^2$") of the gas turbine engine. For example, engine 10 shown and described in regard to FIGS. 1-12 may generally reduce $AN^2$ relative to a conventional geared turbofan configuration. Generally, lowering the $AN^2$, such as by reducing the rotational speed and/or the flow area, increases the required average stage work factor (i.e. the average required loading on each stage of rotating airfoils). However, the systems described herein may lower the $AN^2$ while also lowering the average stage work factor and maintaining axial length of the turbine section 90 (compared to engines of similar thrust output and packaging) by interdigitating the first turbine rotor 100 among the one or more stages of the second rotating component 120 while also defining a non-digitated turbine structure (i.e. the inner shroud 112 and the plurality of inner drum airfoils 119) toward the downstream end 98 of the turbine section 90. Therefore, the first turbine rotor 100 may increase the quantity of rotating stages of airfoils while reducing the average stage work factor, and therefore the $AN^2$, while mitigating increases in axial length to produce a similar $AN^2$ value. The first turbine rotor 100 may further reduce the $AN^2$ while additionally reducing the overall quantity of airfoils, rotating and stationary, in the turbine section 90 relative to turbine sections of gas turbine engines of similar power output and/or packaging.

Furthermore, the systems shown in FIGS. 1-12 and described herein may further improve engine efficiency, reduce airfoil quantity, reduce engine weight, and/or alleviate combustion section design constraints by interdigitating the first turbine rotor 100 forward or upstream 99 of the second rotating component 120 defining the high speed turbine 28. For example, defining the first stage of the first turbine rotor 100 as immediately downstream 98 of the combustion section 26, without a first turbine vane or nozzle guide vane therebetween, as well as defining the first turbine rotor 100 in counter-rotation with the second rotating component 120, may reduce effects of overall combustion hot spots on the first stage of the first turbine rotor 100 in contrast to a stationary, first turbine vane or nozzle guide vane. As such, the turbine section 90 and engine 10 described herein may remove constraints to combustion section 26 design by de-emphasizing hot spots, or combustion pattern factor, in favor of other design criteria, such as decreasing emissions, improving lean blow-out (LBO) and/or altitude re-light, improving overall operability across part or all of an operating envelope, or increasing the operating envelope.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
a torque frame comprising an inner shroud defined circumferentially around an axial centerline, an outer shroud surrounding the inner shroud and defined circumferentially around the axial centerline, a structural member extended along the radial direction and coupled to the inner shroud and the outer shroud, wherein the torque frame is configured to rotate around the axial centerline, and wherein the torque frame comprises an outer band circumferentially surrounding the outer shroud, wherein the outer band is extended at least partially along the radial direction, and wherein a plurality of connecting members extend at least partially along the radial direction and couple the outer shroud and the outer band, and wherein the connecting members define a spring.

2. The gas turbine engine of claim 1, wherein the structural member is extended along a longitudinal direction to define a lean angle relative to the axial centerline.

3. The gas turbine engine of claim 2, wherein the lean angle is acute relative to the axial centerline, wherein a radially outward end of the structural member is disposed upstream of a radially inward end of the structural member.

4. The gas turbine engine of claim 2, wherein the lean angle is acute relative to the axial centerline, wherein a radially inward end of the structural member is disposed upstream of a radially outward end of the structural member.

5. The gas turbine engine of claim 1, wherein the structural member defines an airfoil defining a pressure side and a suction side.

6. The gas turbine engine of claim 1, wherein the connecting members extend at least partially along the circumferential direction from the outer shroud to the outer band.

7. The gas turbine engine of claim 1, wherein the connecting members define an approximately V cross section.

8. The gas turbine engine of claim 1, wherein the outer band defines an annular ring generally concentric about the axial centerline.

9. The gas turbine engine of claim 1, wherein the outer shroud defines a platform extended at least partially along the longitudinal direction and at least partially along the circumferential direction, and wherein the connecting members extend from the platform to the outer band.

10. The gas turbine engine of claim 1, wherein the outer band defines one or more balance planes along a portion of an inner diameter and/or along a portion of an outer diameter.

11. The gas turbine engine of claim 1, wherein the structural member, the inner shroud, and the outer shroud together define an integral structure.

12. The gas turbine engine of claim 1, wherein the structural member, the inner shroud, the outer shroud, the plurality of connecting members and the outer band together define an integral structure.

13. The gas turbine engine of claim 1, further comprising:
an outer drum rotor coupled to the outer band of the torque frame, wherein the outer drum rotor comprises one or more stages of a plurality of outer drum airfoils extended inward along the radial direction.

14. The gas turbine engine of claim 13, further comprising:
a second turbine rotor disposed radially inward of the outer drum rotor, wherein the second turbine rotor comprises one or more stages of second turbine airfoils extended outward along the radial direction, and further wherein the second turbine rotor is independently rotatable relative to the torque frame and the outer drum rotor, and wherein the torque frame is disposed downstream of the second turbine rotor.

15. The gas turbine engine of claim 14, wherein the torque frame and the outer drum rotor together define a low speed rotor, and wherein the second turbine rotor defines a higher speed rotor relative to the low speed rotor.

16. The gas turbine engine of claim 13, further comprising:
an inner drum rotor coupled to the inner shroud of the torque frame, wherein the inner drum rotor comprises one or more stages of a plurality of inner drum airfoils extended outward along the radial direction, and wherein the torque frame, the outer drum rotor, and the inner drum rotor together rotate at a first speed around the axial centerline.

17. The gas turbine engine of claim 13, further comprising:
a second turbine rotor disposed radially inward of the outer drum rotor, wherein the second turbine rotor comprises one or more stages of second turbine airfoils extended outward along the radial direction, and further wherein the second turbine rotor is independently rotatable relative to the torque frame and the outer drum rotor, and wherein the torque frame is disposed upstream of the second turbine rotor.

* * * * *